(12) United States Patent
Metelius

(10) Patent No.: US 11,314,381 B2
(45) Date of Patent: Apr. 26, 2022

(54) SCROLLING THROUGH A PLURALITY OF ENTITIES

(71) Applicant: Peratech Holdco Ltd, Richmond (GB)

(72) Inventor: Joel Erik Christoffer Metelius, Stockholm (SE)

(73) Assignee: Peratech Holdco Ltd, Richmond (GB)

( * ) Notice: Subject to any disclaimer, the term of this patent is extended or adjusted under 35 U.S.C. 154(b) by 0 days.

(21) Appl. No.: 16/759,472

(22) PCT Filed: Oct. 17, 2018

(86) PCT No.: PCT/GB2018/000136
§ 371 (c)(1),
(2) Date: Apr. 27, 2020

(87) PCT Pub. No.: WO2019/081878
PCT Pub. Date: May 2, 2019

(65) Prior Publication Data
US 2020/0285354 A1    Sep. 10, 2020

(30) Foreign Application Priority Data

Oct. 27, 2017 (GB) ..................................... 1717690

(51) Int. Cl.
| | | |
|---|---|---|
| *G06F 3/0485* | (2022.01) | |
| *G06F 3/0482* | (2013.01) | |
| *G06F 3/04883* | (2022.01) | |
| *H04N 21/47* | (2011.01) | |

(52) U.S. Cl.
CPC .......... *G06F 3/0482* (2013.01); *G06F 3/0485* (2013.01); *G06F 3/04883* (2013.01); *H04N 21/47* (2013.01)

(58) Field of Classification Search
CPC .. G06F 3/0482; G06F 3/0485; G06F 3/04883; H04N 21/47
See application file for complete search history.

(56) References Cited

U.S. PATENT DOCUMENTS

| | | | |
|---|---|---|---|
| 9,030,419 B1* | 5/2015 | Freed .................... | G06F 3/0488 345/173 |
| 2007/0006099 A1 | 1/2007 | Johnson et al. | |
| 2007/0024595 A1 | 2/2007 | Baker et al. | |
| 2011/0050591 A1* | 3/2011 | Kim .................... | G06F 15/0291 345/173 |
| 2011/0087997 A1 | 4/2011 | Lee et al. | |
| 2012/0274662 A1* | 11/2012 | Kim ...................... | G11B 27/34 345/650 |
| 2013/0055150 A1 | 2/2013 | Galor | |
| 2013/0111396 A1* | 5/2013 | Brid ...................... | G06F 3/0485 715/784 |

(Continued)

*Primary Examiner* — Beau D Spratt
(74) *Attorney, Agent, or Firm* — Richard M. Goldberg

(57) ABSTRACT

Manual selection of an entity from a list of entities displayable by scrolling is facilitated. A list (101) of selectable entities is established. A range (1002) is identified of selectable entities (E006 TO E050) within the list. A portion (1003) of the range is displayed and output signals are received in response to manually applied pressure. Scrolling is performed through the range, not directly through the list, at a rate related to the manually applied pressure. The range is reduced during the scrolling operation to remove entities that are clearly not to be selected.

16 Claims, 18 Drawing Sheets

(56) References Cited

U.S. PATENT DOCUMENTS

| | | | | |
|---|---|---|---|---|
| 2014/0152581 A1* | 6/2014 | Case | ................... | G06F 3/0485 |
| | | | | 345/173 |
| 2016/0170629 A1* | 6/2016 | Gabryjelski | ........ | G06F 3/04855 |
| | | | | 715/786 |
| 2017/0357520 A1* | 12/2017 | De Vries | ............... | G06F 3/0362 |
| 2018/0275756 A1* | 9/2018 | Rai | ................. | H04N 21/42224 |
| 2019/0310723 A1* | 10/2019 | Kang | .............. | G06Q 20/40145 |

\* cited by examiner

SCROLLING THROUGH A PLURALITY OF ENTITIES

CROSS REFERENCE TO RELATED APPLICATIONS

This application claims priority from United Kingdom Patent Application number 17 17 690.0, filed on 27 Oct. 2017, the whole contents of which are incorporated herein by reference.

BACKGROUND OF THE INVENTION

The present invention relates to a method of facilitating manual selection of an entity from a list of entities displayed in a scrollable list. The present invention also relates to an apparatus for allowing a user to make a manual selection.

It is known to provide systems that are arranged to scroll through a plurality of entitles, non-exclusively including television channels, destinations for navigation systems, image frames in video assets and items of text in text files. Often, a user will overshoot a desired position which will then result in a scrolling operation being performed in the reverse direction; which again may result in an overshoot and so on until a desired location is identified.

With a variable control, such as that provided by a resistive touch-pad, it is possible to increase and decrease the rate of scrolling as the desired point is approached. However, experience has shown that systems of this type also often result in overshoot situations occurring and the general user experience is considered to be unsatisfactory.

BRIEF SUMMARY OF THE INVENTION

According to a first aspect of the present invention, there is provided a method of facilitating manual selection of an entity from a range of entities displayed in a scrollable list as set out in the claims.

According to a second aspect of the present invention, there is provided an apparatus for allowing a user to make a manual selection as set out in the claims.

According to a third aspect of the present invention, there is provided a television system as set out in the claims.

The invention will be described, by way of example only, with reference to the accompanying drawings.

DETAILED DESCRIPTION OF EMBODIMENTS OF THE INVENTION

FIG. 1

Figure 1:
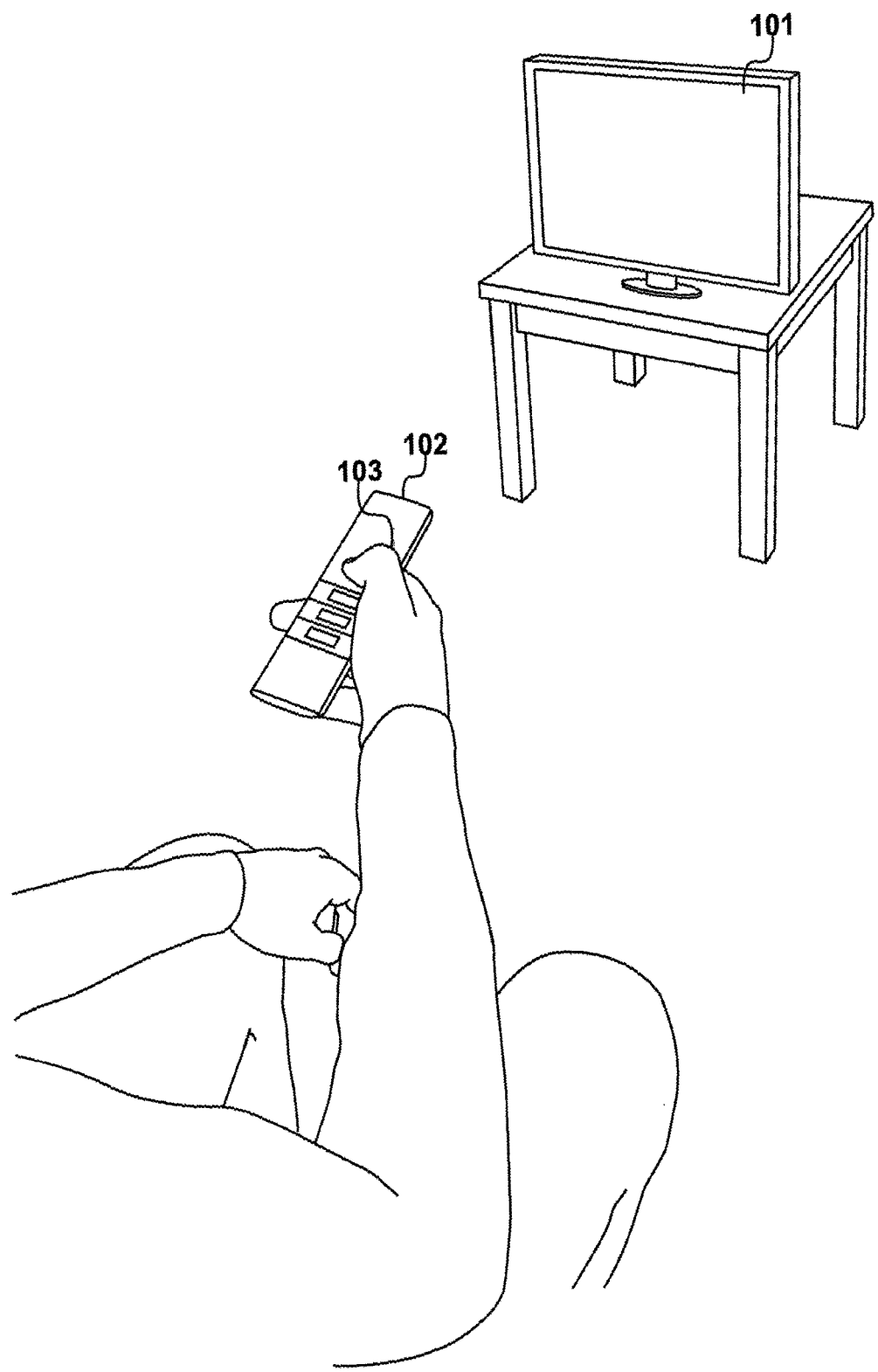
FIG. 1 shows a television system that includes a television-set and a remote-control-device.

A television system is shown in FIG. 1 that includes a television-set 101 and a remote-control-device 102. The remote-control-device includes a housing that defines an interactive-surface 103 for receiving manual pressure in response to operations performed by a user. A user may apply pressure from any digit, including fingers and thumbs. As used herein, reference to a finger also includes an application of a thumb.

FIG. 2

The remote-control-device 102 includes a plurality of sensor elements mounted on a substrate 201. These are placed in mechanical proximity to the interactive surface 103. Each sensor element is substantially electrically non-conductive before a mechanical interaction occurs and becomes increasingly conductive with increasing levels of interaction.

The substrate 201 is connected to a processor (a microcontroller 202) and the microcontroller 202 is configured to supply drive voltages to the sensor elements and receive sense currents from these sensor elements.

The apparatus is responsive to a manual interaction, such as the movement of a finger over the interactive surface; thus, it is possible for the detector to generate positional data. Furthermore, at a selected position, applied pressure may vary, in response to which pressure related data is also generated. Thus, the device is pressure sensitive in the Z direction.

Figure 2:
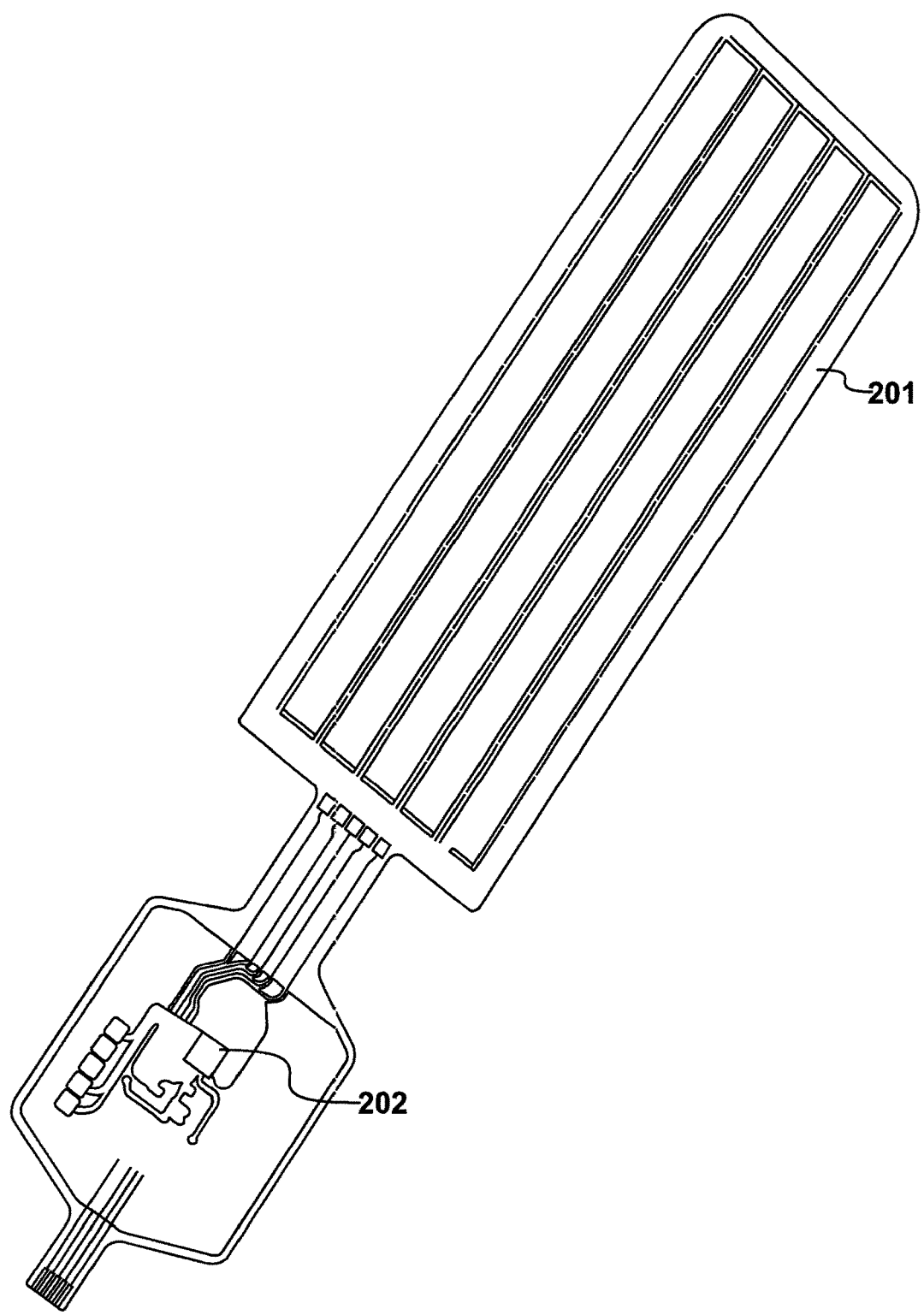
FIG. 2 details components within the remote-control-device identified in FIG. 1.

In the example shown in FIG. 2, the sensor elements are arranged in an array behind the interactive surface 103. In this particular example, the array includes fourteen sensor elements along its length and five sensor elements across its width, giving a total of seventeen individual sensor elements. However, it should be appreciated that other configurations are possible.

FIG. 3

Figure 3:
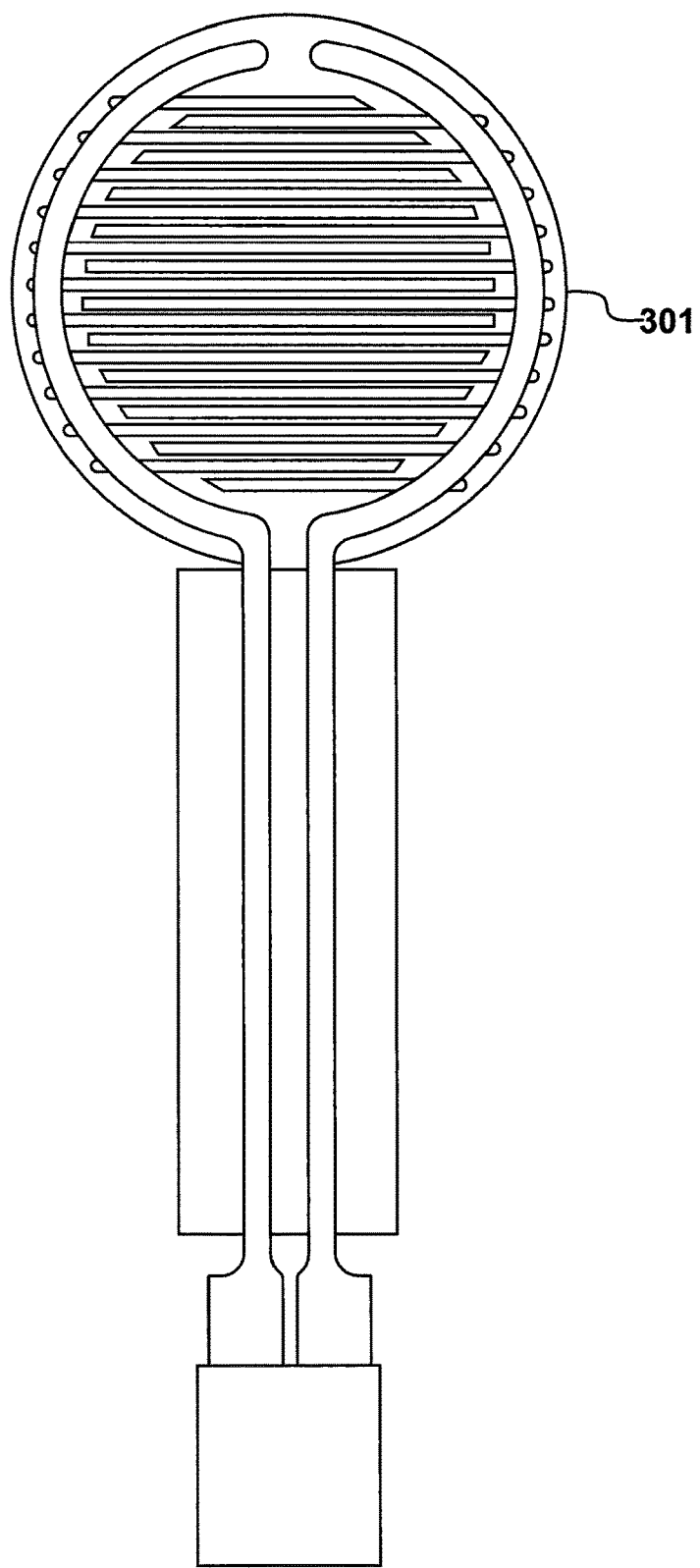
FIG. 3 shows an example of an individual sensor element of the type used in the matrix identified in FIG. 2.

An individual sensor-element 301 is shown in FIG. 3 and may take the form of a sensor including material sold under the trademark QTC® by the present applicant. Material of this type is also identified by the designation quantum tunneling compound.

QTC® sensor elements, such as sensor element 301, are pressure sensitive membrane switches that change resistance in a predictable manner following an application of force. In the circuitry disclosed herein, the sensor may be seen as a variable resistor that can be implemented within an electronic system using a voltage divider circuit.

FIG. 4

Figure 4:
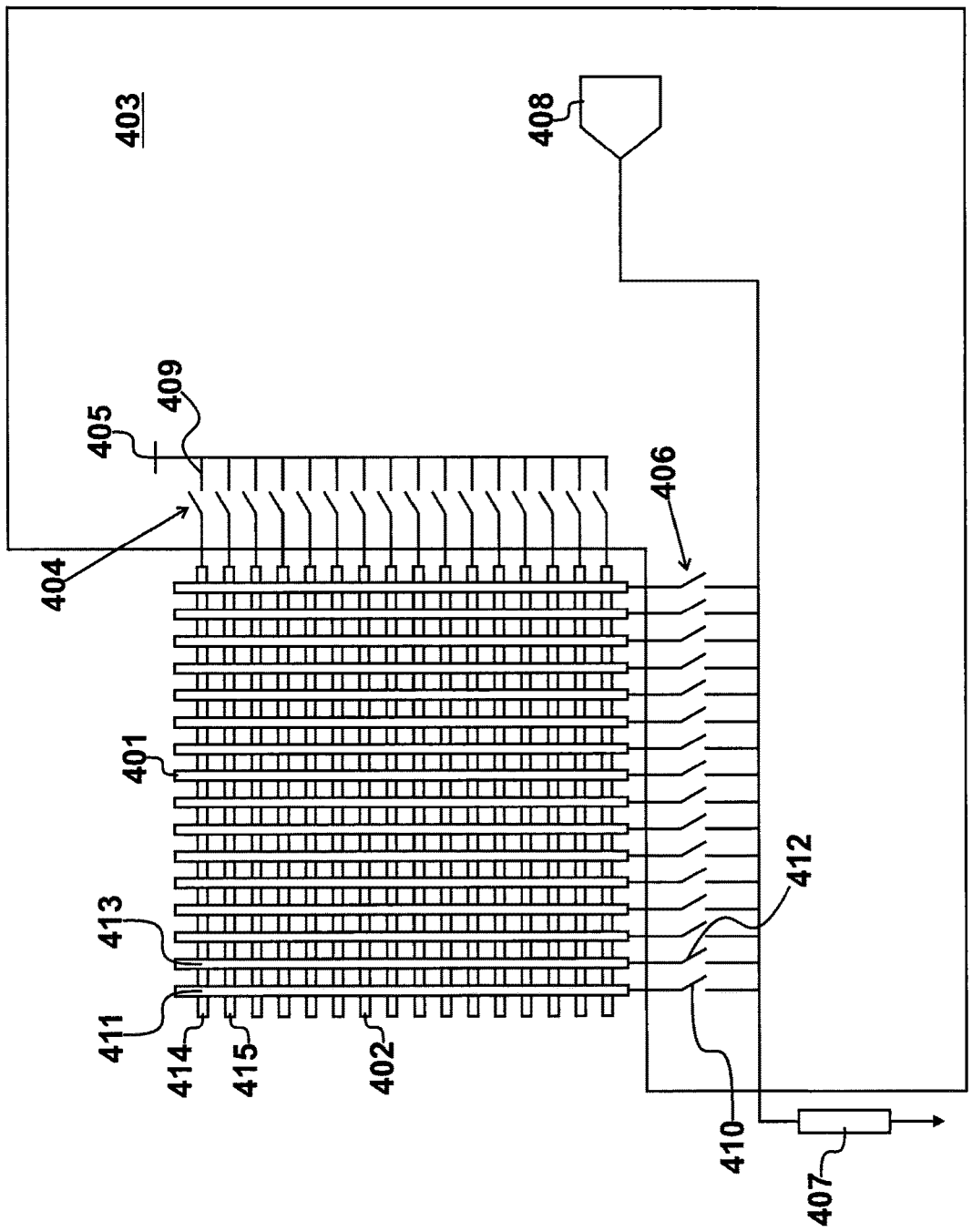
FIG. 4 illustrates an arrangement of sensor elements in a matrix with a microcontroller.

In order for a single microcontroller to consider input data from a substantial number of sensor elements, it is possible to configure the devices in a multiplexing circuit, as illustrated in FIG. 4. A plurality of column conductors 401 are positioned above a plurality of row conductors 402. A sensor element is provided at the intersection of each column conductor with each row conductor. Thus, at each intersection, pressure may be detected by energising a respective sensor element.

To achieve a multiplexing operation, the microcontroller provides an electrical connection to each row conductor 402, along with an electrical connection to each column conductor 401. Instructions executed by a microcontroller 403 perform a multiplexing operation, illustrated by a first group of switches 404. Thus, switches 404 are activated sequentially such that, at any instant, only one of the conductors 402 is connected to a drive voltage 405. Similarly, a second group of switches 406 ensure that only one of the column conductors 401 is connected in series with a reference resistor 407 at any instant to define a voltage divider. A tapped voltage from this voltage divider is applied to an analog to digital convertor 408 such that, at any instant, only current from one of the column conductors 401 results in the application of a measurable voltage being applied to the analog-to-digital convertor 408.

When operational, a first switch 409 of the first group is activated and each of the switches of the second group are activated sequentially. Thus, a first switch 410 is closed resulting in a measurement being made at detector position 411. Thereafter, a second switch 412 is closed, resulting in a measurement being made for detector position 413. Thus, this process continues across a first row 414.

Having sampled each position across row 414, the next row, row 415, is selected and the process is repeated. In this way, output lines 402 drive the detector array and column lines 401 sense values of the detector array. Thereafter, further instructions executed by the microcontroller 403 allow the resulting temporal signals to be converted back into a spatial representation, thereby allowing spatial interactions and movements to be detected from multiple independent locations.

FIG. 5

Figure 5:
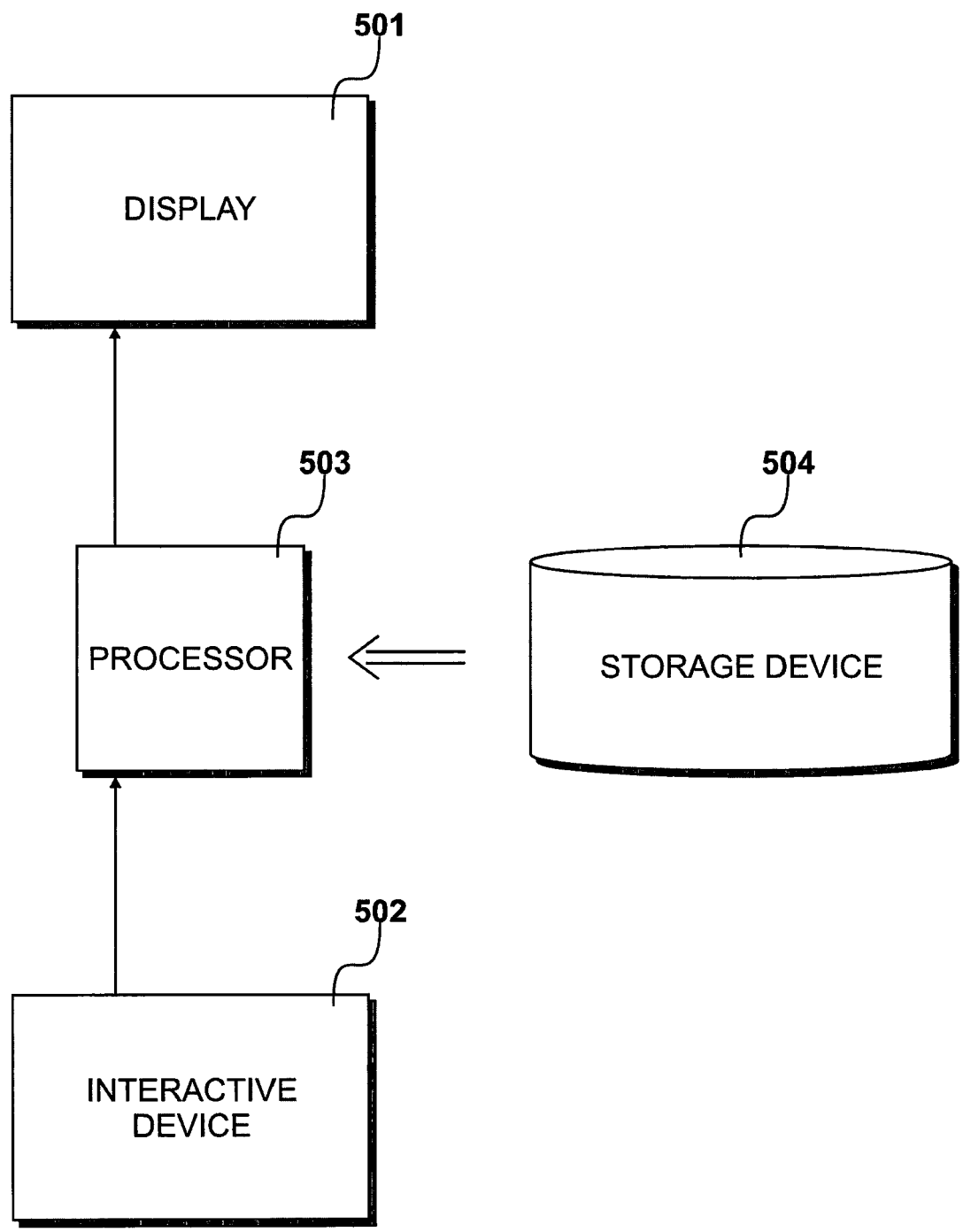
FIG. 5 shows a general overview of an apparatus for allowing a user to make a manual selection.

A general overview of an apparatus for allowing a user to make a manual selection is illustrated in FIG. 5. A display device 501 shows a range of entities in a scrollable list. A manually interactive device 502 is arranged to produce an output signal that changes by an extent related to an applied level of pressure. A processor 503 is configured to scroll through the list at a rate determined by the output signal. Furthermore, the processor is configured to reduce the range of entries in the list that may actually be displayed as a scrolling operation is performed.

Data displayed on the display device 501 may also include visual or graphical data derived from a storage device 504.

FIG. 6

In an embodiment, the display-device 501 may be combined with the manually-interactive-device 502 to form a touch sensitive screen supported by a back-plane 601. Thus, provided the display-device 501 is sufficiently flexible, it is possible for a front-panel 602 to receive manual interactions, as illustrated by arrow 603, while presenting visual images to a user, as illustrated by arrow 604.

FIG. 7

Figure 6:
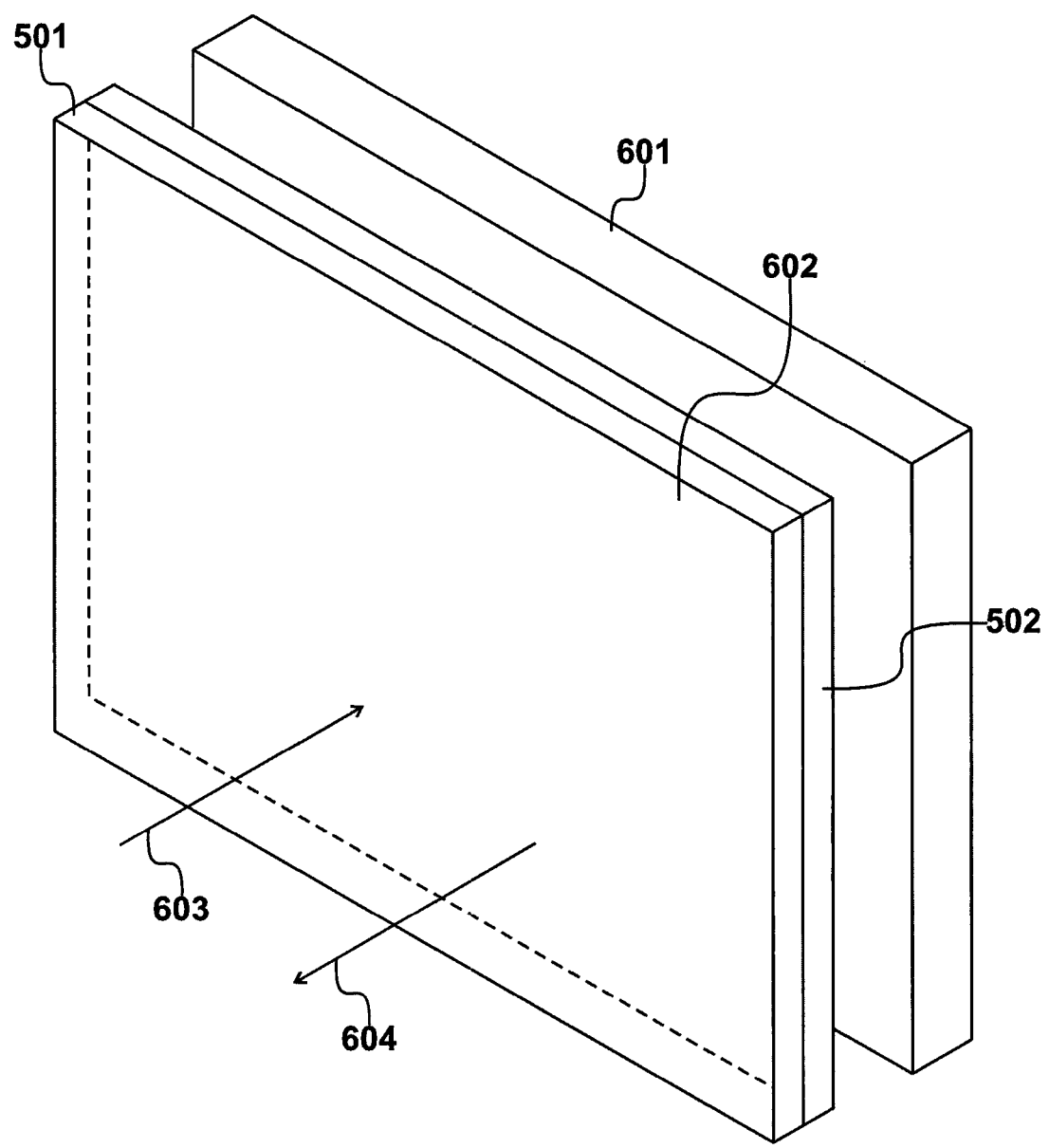
FIG. 6 shows a combined display-device and a manually-interactive-device.
Figure 7:
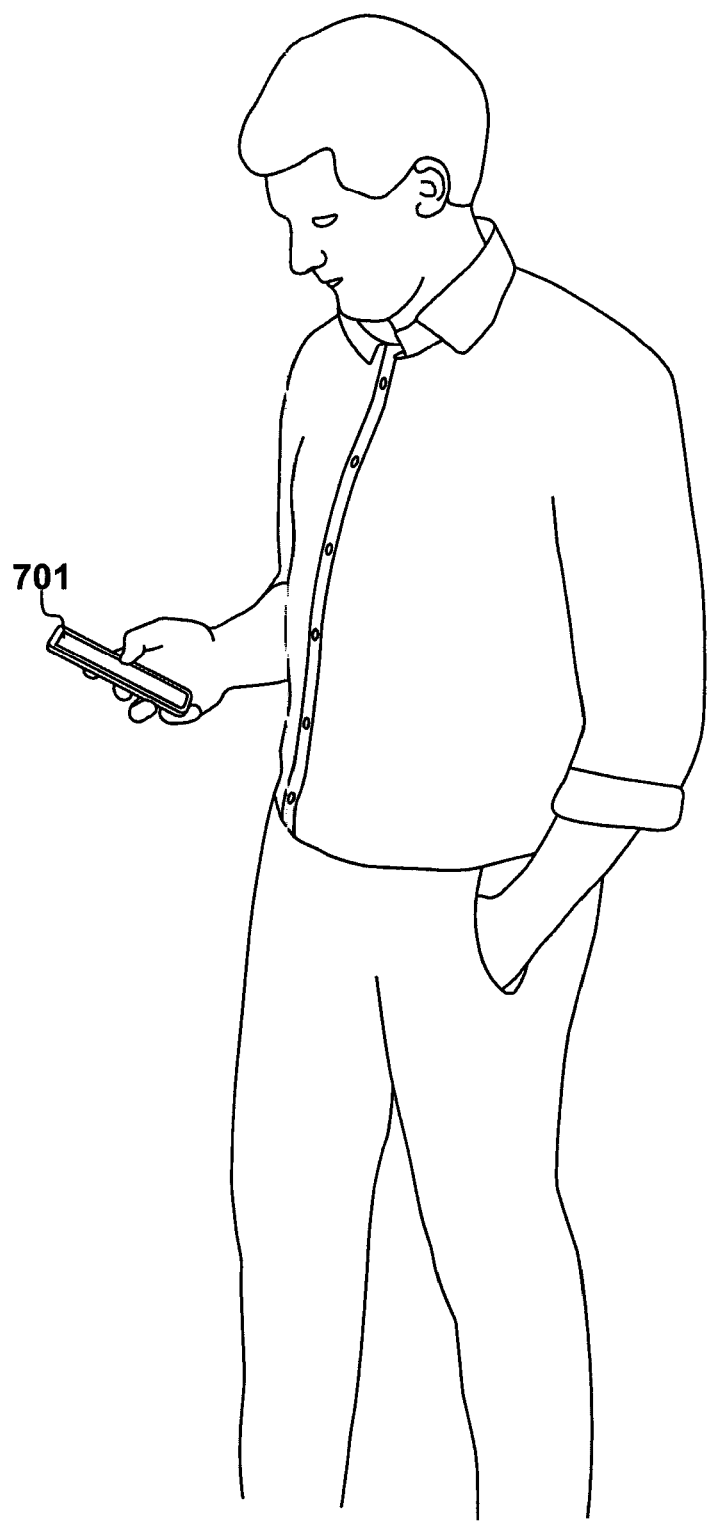
FIG. 7 shows the use of the subassembly of FIG. 6 in a mobile device.
Figure 8:
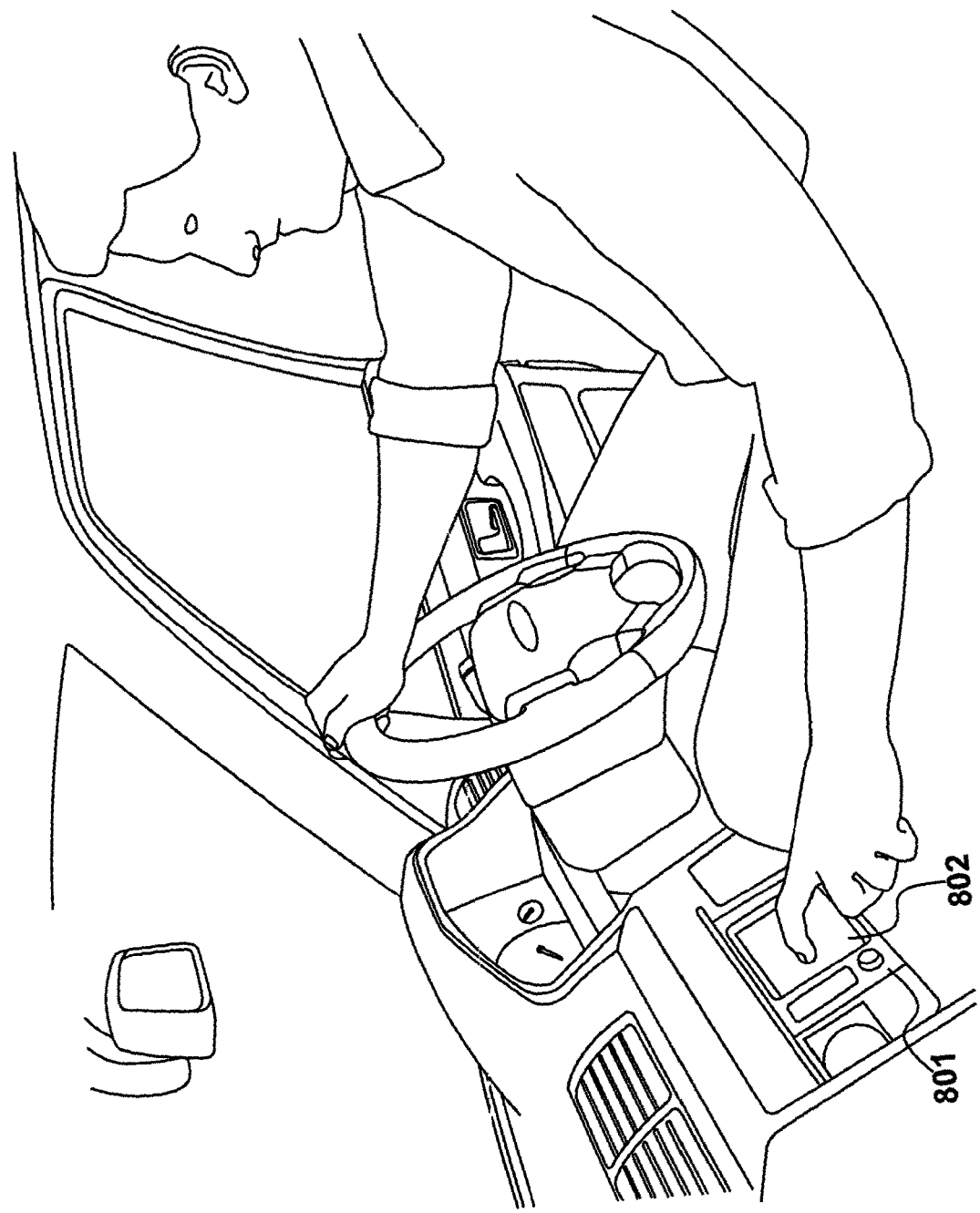
FIG. 8 shows the use of the subassembly of FIG. 6 in a satellite navigation device.

The subassembly shown in FIG. 6 may be included in a mobile device, such as a mobile cellular telephone 701. Increasingly, television programmes are shown on mobile devices and again the embodiment of FIG. 7 may facilitate scrolling operations in order to select particular channels. Thus, device 701 is configured to scroll through a list of channels at a rate determined by output signals produced in response to manually applied pressure and to reduce this range as a scrolling operation is performed.

Furthermore, the mobile device 701 may be arranged to perform other scrolling operations to identify particular frames within a video asset, to identify particular portions of documents or to identify particular destinations when programming a satellite navigation application. Furthermore, in order to enhance the usability of a satellite navigation system, external data may be received via the internet. Thus, in the implementation of FIG. 7, data storage device 504 is remote or cloud-based.

FIG. 8

An alternative application for satellite navigation is to provide a dedicated satellite navigation system 801 within a vehicle. The satellite navigation system includes a touch-screen 802 having a construction substantially similar to that shown in FIG. 6.

Again, a scrolling operation, to identify a particular destination, is facilitated by reducing the range of displayable entities as a scrolling operation is performed. Furthermore, additional graphical information may be displayed and, on this occasion, data storage 504 may be provided locally.

FIG. 9

Figure 9:
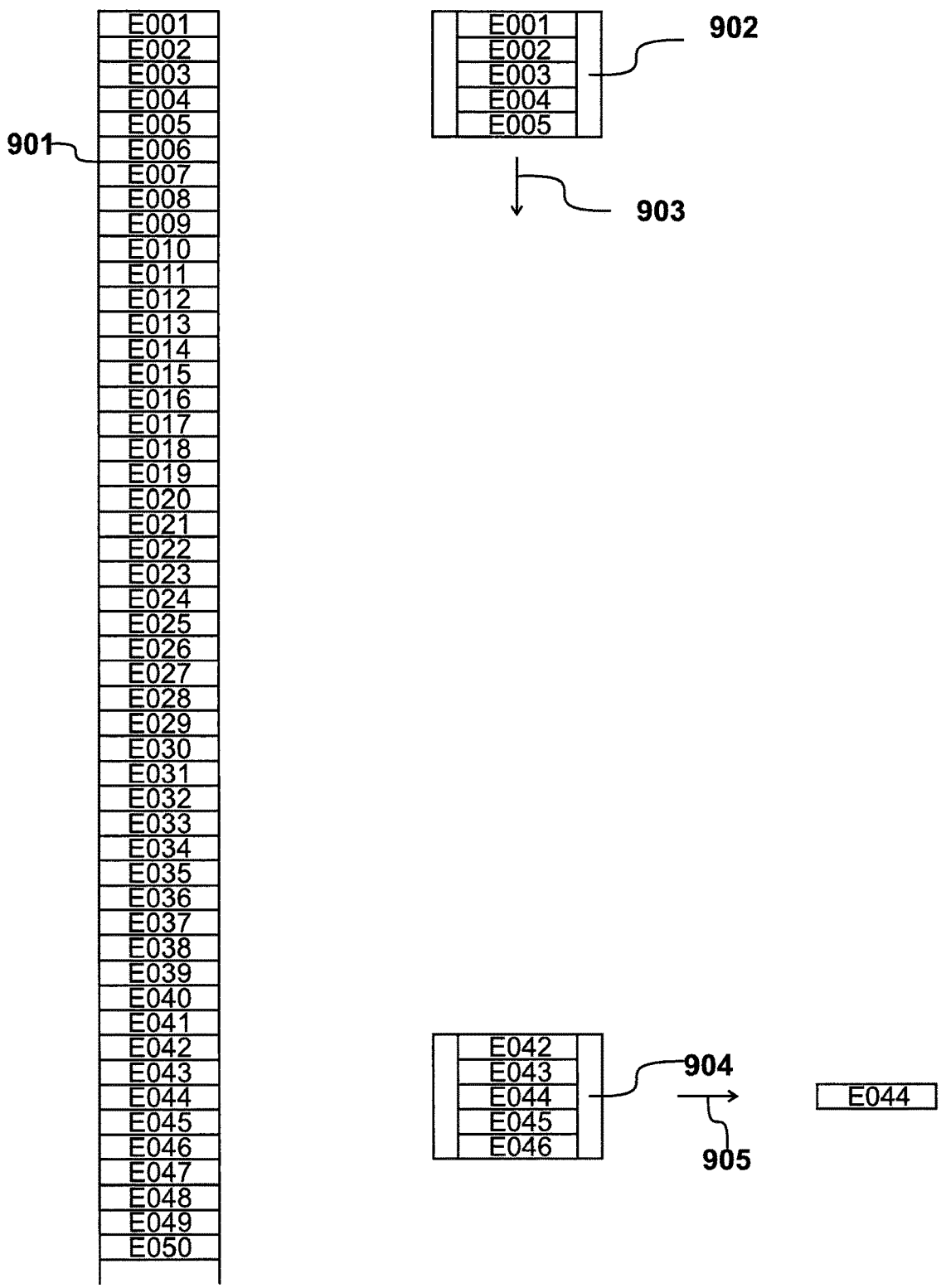
FIG. 9 shows an example of a conventional scrolling system.

An example of a conventional scrolling system is illustrated in FIG. 9. Entities E001 to E050 are included in a list 901 retained within the processor 503. Depending upon the particular application, this list may be derived from locally stored data or, alternatively, the list may be derived from data downloaded from elsewhere. In an example previously described, the list identifies particular television channels that may be selected.

Due to the limitations of the display device, only a portion 902 may be displayed at any one time, from which a particular selection may be made. In this example, it is assumed that a user is looking to select entity E044. Thus, the displayed portion is scrolled, as indicated by arrow 903, from position 902 to position 904. This is achieved by a user making a particular menu selection and then pressing an interactive device in order to increase or decrease the rate of scrolling. Thereafter, having reached position 904, particular entity E044 is selected as illustrated by arrow 905.

A problem with the approach shown in FIG. 9 is that significant manual dexterity is required in order to successfully scroll the displayed portion from position 902 to position 904 without overshooting and then being required to perform multiple backwards and forwards scrolling operations until the appropriate positon is reached. In the example of FIG. 9, fifty entities are shown and a total of two-hundred are present; but it should be understood that in some embodiments, significantly more entities could be present.

FIG. 10

Figure 10:
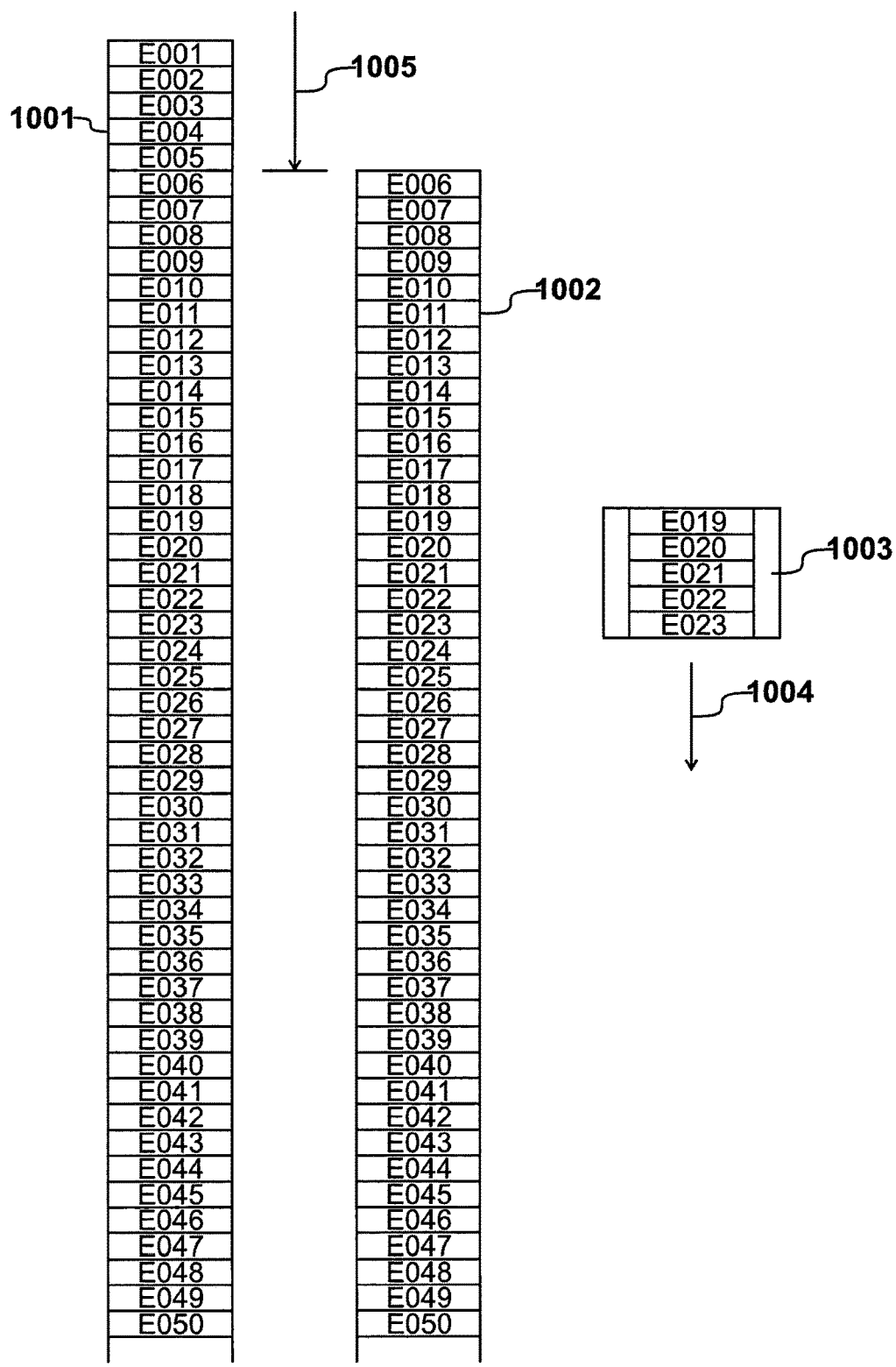
FIG. 10 illustrates a scrolling system embodying an aspect of the present invention.

A method embodying an aspect of the present invention is illustrated in FIG. 10. A list 1001 is established that is substantially similar to list 901 identified in FIG. 9. A portion of the available entities is displayed. However, this portion is not displayed directly from list 1001. In addition to establishing list 1001, a range 1002 is also identified that represents identities that are selectable by being present within the list 1001. Thus, a portion 1003 of entities is displayed from the range 1002.

Output signals are received from the interactive device 502 in response to manually applied pressure. This results in a scrolling operation being performed, as identified by arrow 1004, through the range 1002 at a rate that is related to the extent of manually applied pressure. However, during the scrolling operation, the range 1002 is reduced.

Upon initiating a scrolling operation, all entities E001 to E200 are available to be selected via the range 1002 and the display portion 1003. However, as a scrolling operation is performed, as illustrated by arrow 1004 the available range reduces, as indicted by arrow 1005. Thus, when the displayed portion reaches the position identified, only entities E019 to E023 may be selected. Thus, upon performing further scrolling, it is possible for any of entities E006 to E200 from the range 1002 to appear within the displayed portion 1003. However, having scrolled to the position indicated in FIG. 10, entities E001 to E005 are no longer available for selection unto a reset condition is established or a particular entity (television channel for example) has been selected.

FIG. 11

As indicated by arrow 1101, further scrolling has occurred such that entities E046 to E050 appear within the displayed portion 1003. Furthermore, as indicated by arrow 1102, entity E048 has been selected. All entities E001 to E200 remain in the list 1001. However, as indicated by arrow 1103, the range has been reduced further, such that reverse scrolling would only allow a selection to be made from entity E019 to entity E050.

The embodiment described shows a range reducing from entities at the start of the list as a scrolling operation is performed towards the end of the list. However, in an embodiment, it is possible that an overshoot situation may occur; resulting in the scrolling operation reversing, such that scrolling is then performed in the direction of arrow 1104. When this occurs, the range of available entities may be reduced from the end, as indicated by arrow 1105. Thus, in an embodiment, having scrolled in the direction of arrow 1104, some entities may be removed from the end of the range 1002. Thus, the range is reduced during a scrolling operation and entities that have been moved away from are removed from the range.

In a first step, the scrolling operation scrolls from a start of the list, as illustrated in FIG. 10 and moves towards an end of the list. Thus, entities are removed from the range progressively from the start.

FIG. 12

In an embodiment, scrolling speed is adjusted in response to a degree of applied pressure. When using pressure sensors of the type illustrated in FIG. 3, it is possible to achieve a substantially linear result, in FIG. 12, scrolling speed 1201 is plotted against applied force 1202. The response makes use of the linear characteristics of the pressure sensor, such that scroll speed continues to increase linearly with applied force, until a force of 1203 has been applied such that a saturation condition has been reached and the scrolling speed then remains constant at 1204.

FIG. 13

Figure 13:
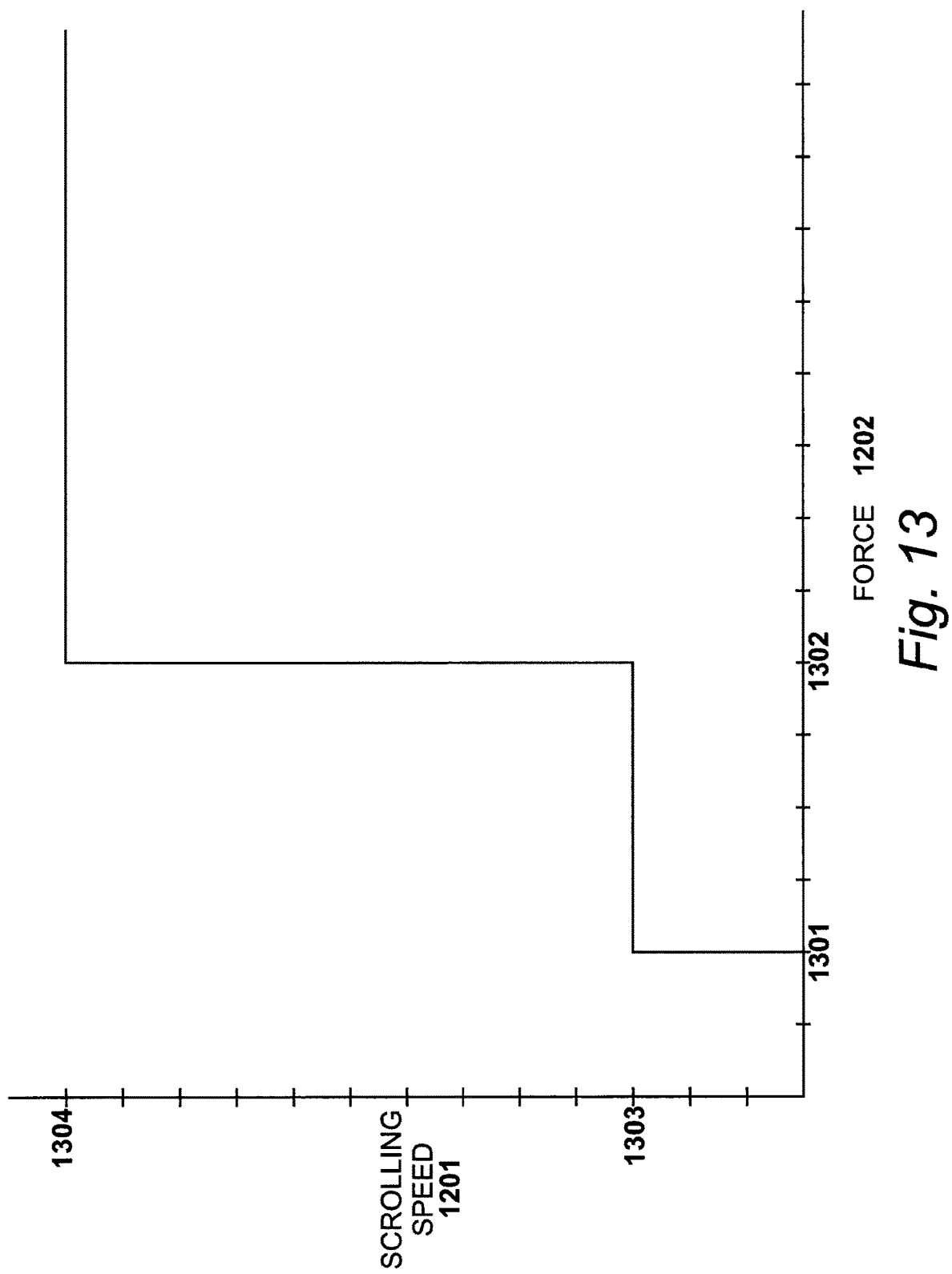
FIG. 13 shows a second relationship between scrolling speed and applied force.

An alternative embodiment is illustrated in FIG. 13. Scrolling speed 1201 is again plotted against force 1202. However, in this example, the response is heavily quantised using appropriate comparison techniques. In this example, until a force greater than 1301 is applied, scrolling does not take place. With an applied force of between 1301 and 1302, the scrolling speed remains constant at 1303. Scrolling speed 1303 may be identified as a normal scrolling speed and pressure must be maintained in order to maintain scrolling at this speed. However, if the applied force exceeds 1302, the scrolling speed is increased to 1304 and remains at this level (effectively the saturation level) even if the applied force increases further.

Figure 11:
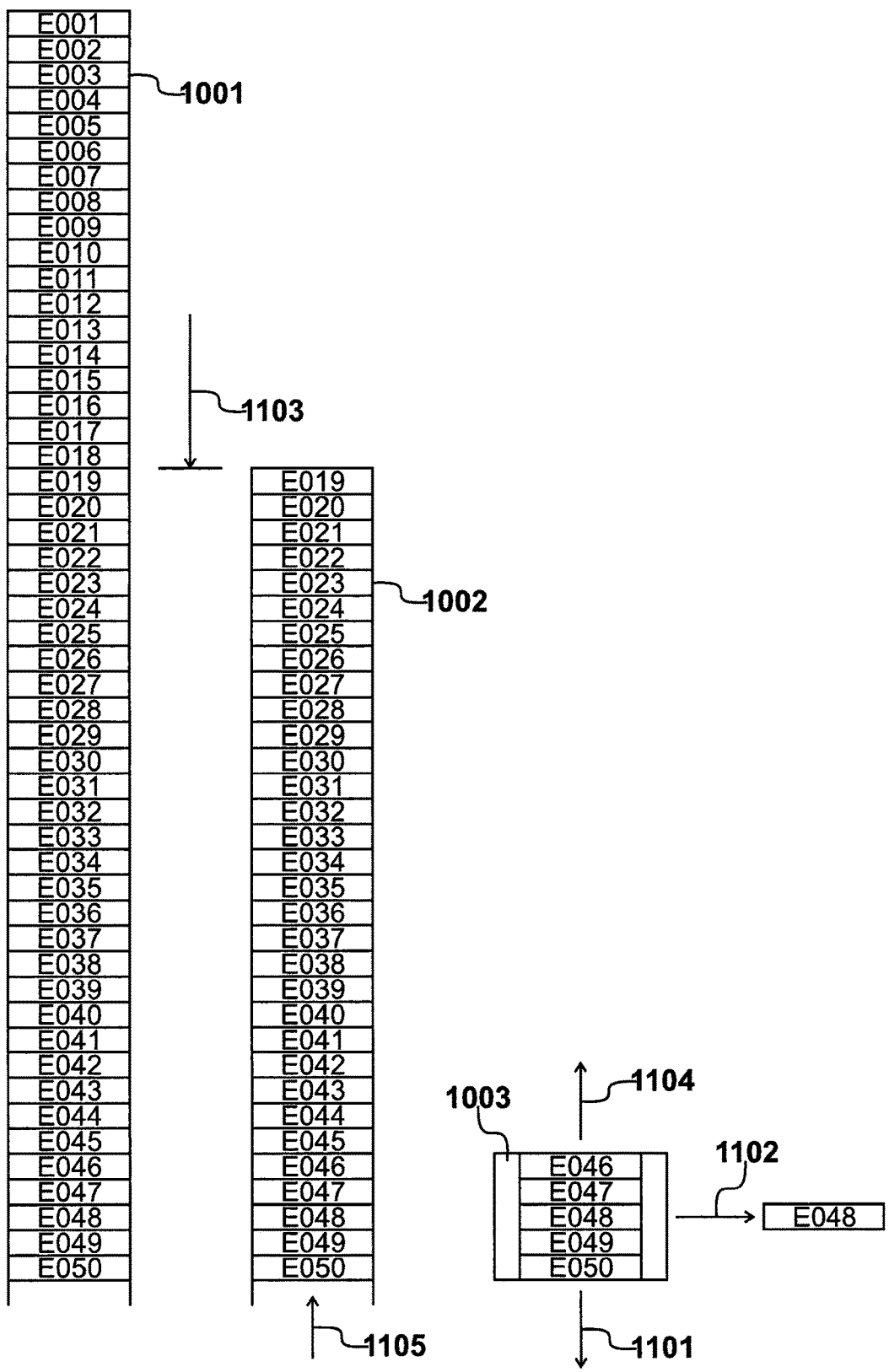
FIG. 11 shows further operation of the system illustrated in FIG. 10.

In an embodiment, during normal scrolling speed 1303, procedures described with reference to FIG. 10 and FIG. 11 are not invoked and the scrolling operation continues in a conventional manner. However, upon entering the fast scrolling speed 1304, procedures previously described are invoked and the range will then reduce during the scrolling operation.

FIG. 14

Figure 12:
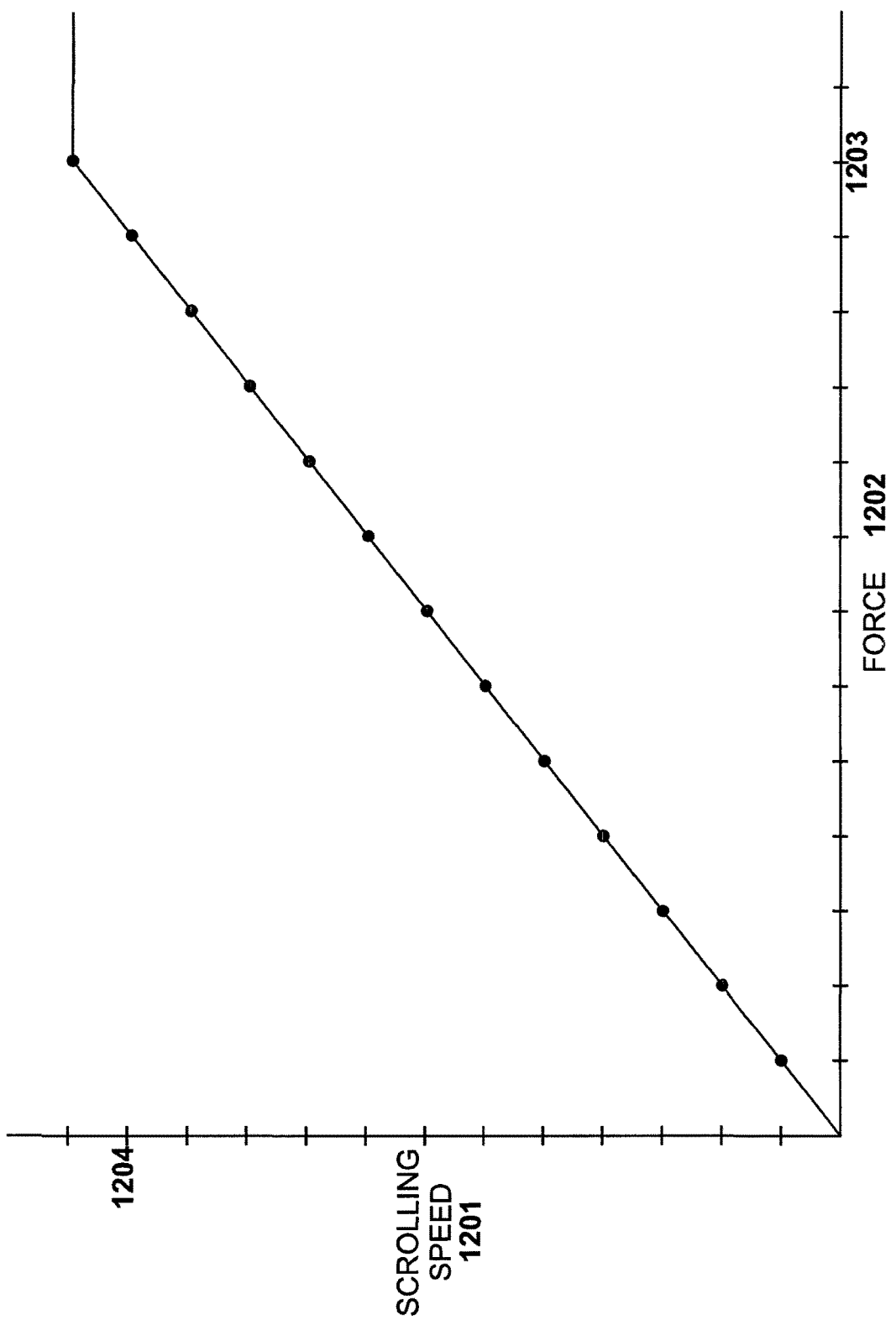
FIG. 12 shows a first relationship between scrolling speed and applied force.
Figure 14:
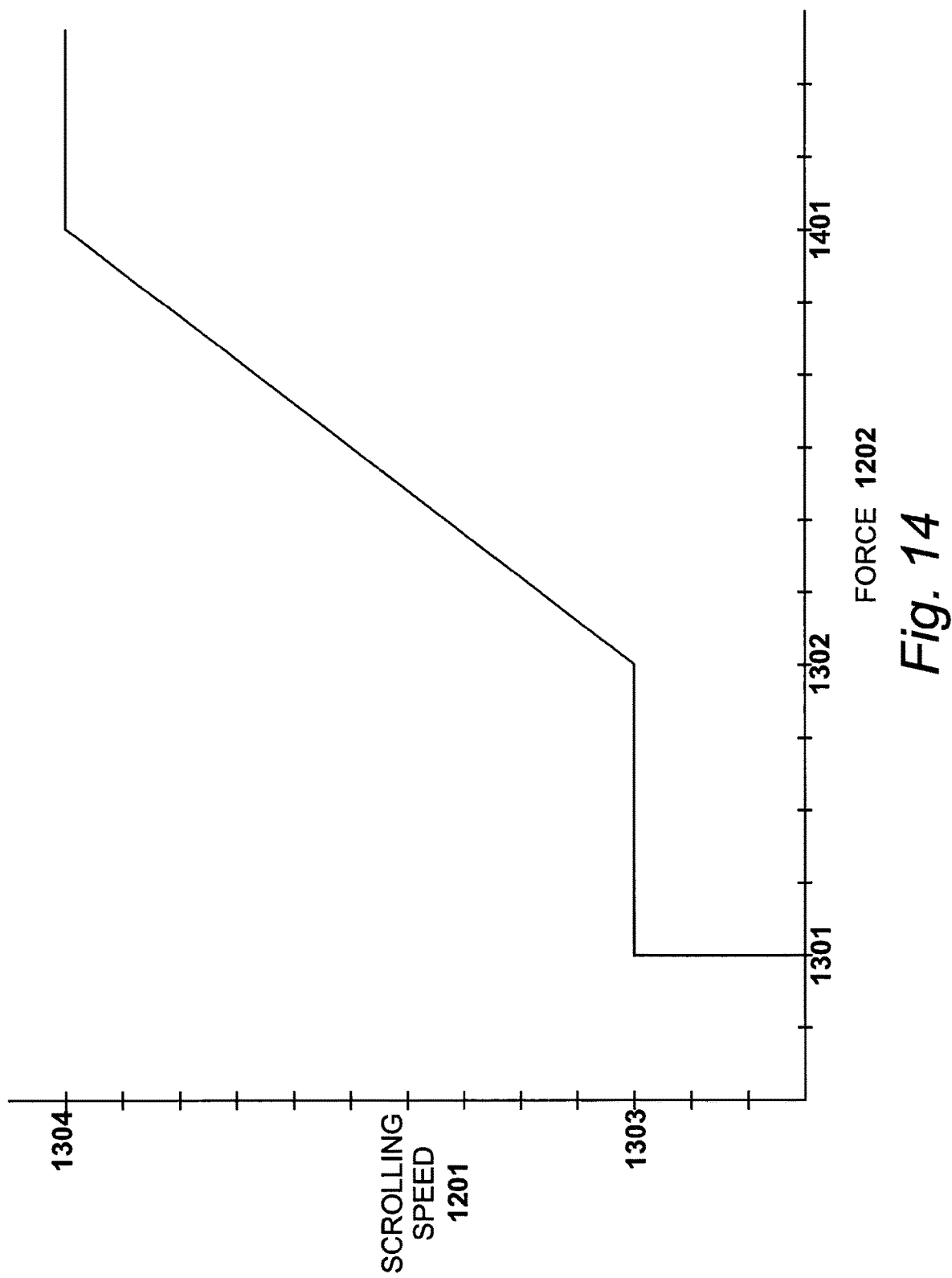
FIG. 14 shows a third relationship between scrolling speed and applied force.

A more sophisticated embodiment is illustrated in FIG. 14, deriving attributes from the response of FIG. 12 and the response of FIG. 13. Again, a force of 1301 is required in order to initiate a normal scrolling process. Normal scrolling continues at a normal scrolling speed 1303 until a force of 1302 is exceeded, in a manner similar to that described with reference to FIG. 13.

When the applied force exceeds 1302, the scrolling speed increases and the procedures described with respect to FIG. 10 and FIG. 11 are invoked. However, the scrolling speed does not immediately jump to the maximum value of 1304 but may be controlled, such that the scrolling speed varies with respect to the applied pressure until a force of 1401 has been reached. Thus, between a force of 1301 and a force of 1302, normal scrolling operates, such that scrolling may be performed over the whole of the list 1001, that is to say, from entities E001 to entity E200. However, upon applying a force greater than 1302, the procedures described herein are invoked, such that the range will start to be reduced. Thus, as illustrated in FIG. 10, it becomes possible to select entities over the range E006 to E200. Thereafter, with further scrolling, as illustrated in FIG. 11, it is only possible to select entitles from E019 to E200.

In this way, if it does become necessary for a user to oscillate during the scrolling process, the overall range over which scrolling occurs will reduce, such that it should be easier for a user to converge upon their preferred selection and for a selection to be made as illustrated by arrow 1102.

FIG. 15

Figure 15:
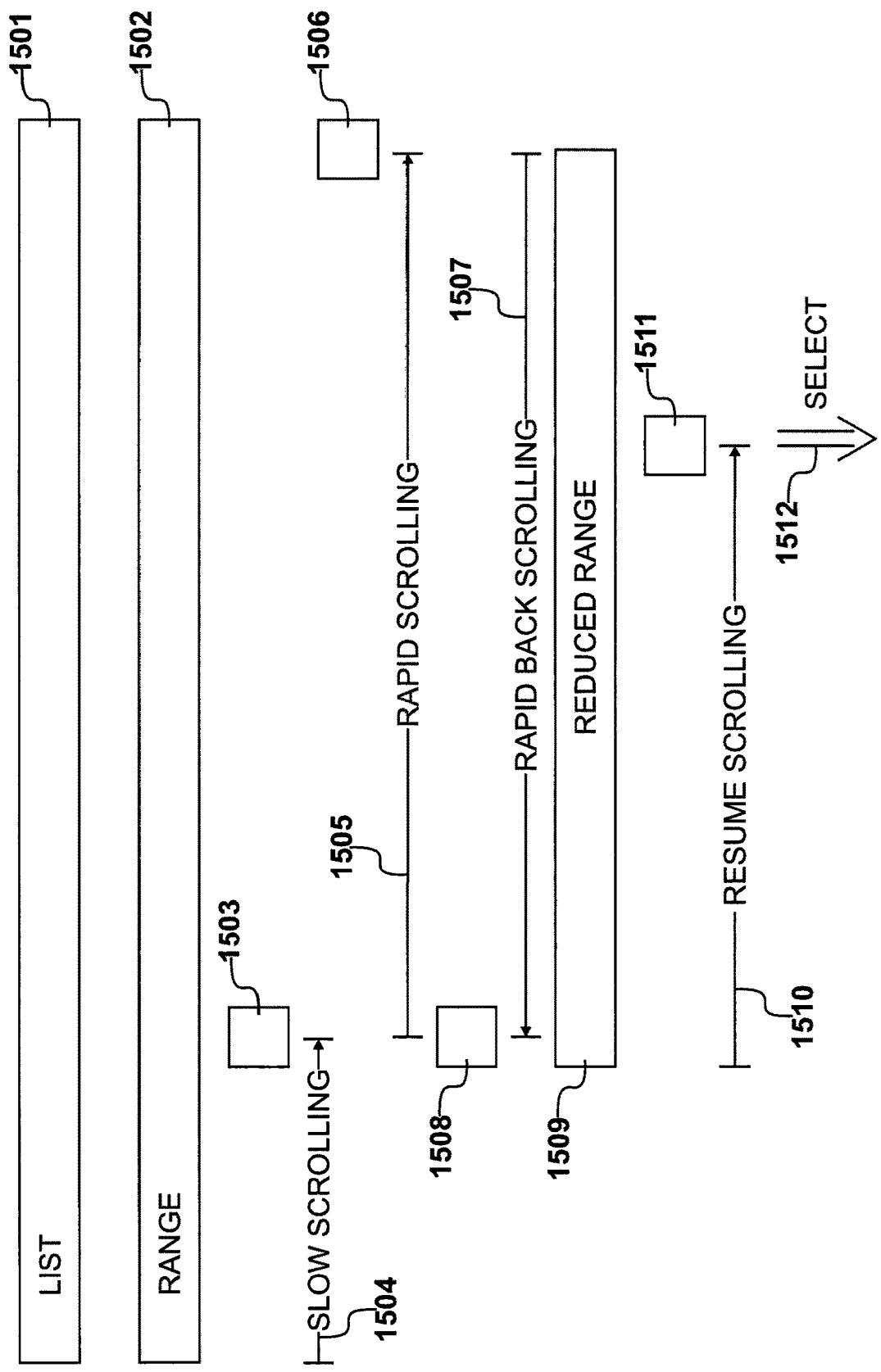
FIG. 15 shows an alternative embodiment for controlling scrolling speed.

An alternative embodiment for reducing a range during a scrolling operation is illustrated in FIG. 15. This approach makes use of the availability to distinguish between a normal scrolling speed of 1303 and an increased scrolling speed between 1303 and 1304.

A list 1501 is established, substantially similar to list 1001. A range 1502 is identified of entities selectable within the list 1501. A portion 1503 of the range is displayed. Output signals are received in response to manually applied pressure and a scrolling operation is performed through the range.

In this embodiment, different operations are performed in response to detecting slow scrolling (up to 1303) and rapid scroll between 1303 and 1304. For the purposes of this illustration, slow scrolling is indicated at 1504. In this embodiment, during this slow scrolling process, the range 1502 is not reduced and continues to represent the whole of the list 1501. However, a change of applied pressure is detected form normal pressure to high pressure and the position at which this transition occurs is noted as being a position in the list 1501. Thus, as illustrated in this example, with the displayed portion at 1503, rapid scrolling 1505 is activated which quickly moves the displayed portion to the end of the range 1502 (and hence to the end of the list 1501) as indicated at 1506.

It is now possible for rapid back scrolling to be performed, as illustrated at 1507. However, when this operation is performed, the displayed portion only returns to the noted position at which rapid scrolling started, as illustrated at 1508. Furthermore, the range has also been reduced, as indicated at 1509. Thus, upon scrolling back, the displayed portion stops at the noted position 1508. Furthermore, the range has been reduced, therefore it is not possible for any further scrolling back beyond the noted position to be performed until a selection has been made. However, scrolling may resume in the forward direction as indicated at 1510.

Again, if the rate of scrolling increases, a further noted position is recorded, allowing back scrolling to be performed to a new noted position; with a consequential reduction in the available range. However, for the purposes of this illustration, it is assumed that a selection has been made at displayed position 1511 as indicated by arrow 1512.

FIG. 16 in an embodiment, reduction of the range is governed or restricted in an attempt to prevent an intended entity from being excluded from the range before a selection has been made. Thus, selection is facilitated by reducing the range, such that entities that are clearly not to be selected are removed from the range. However, given that a slight misjudgment may occur, it is possible for range reduction to become too aggressive and as a result, a potential problem exists in terms of removing an entity that would have been required for selection.

Figure 16:
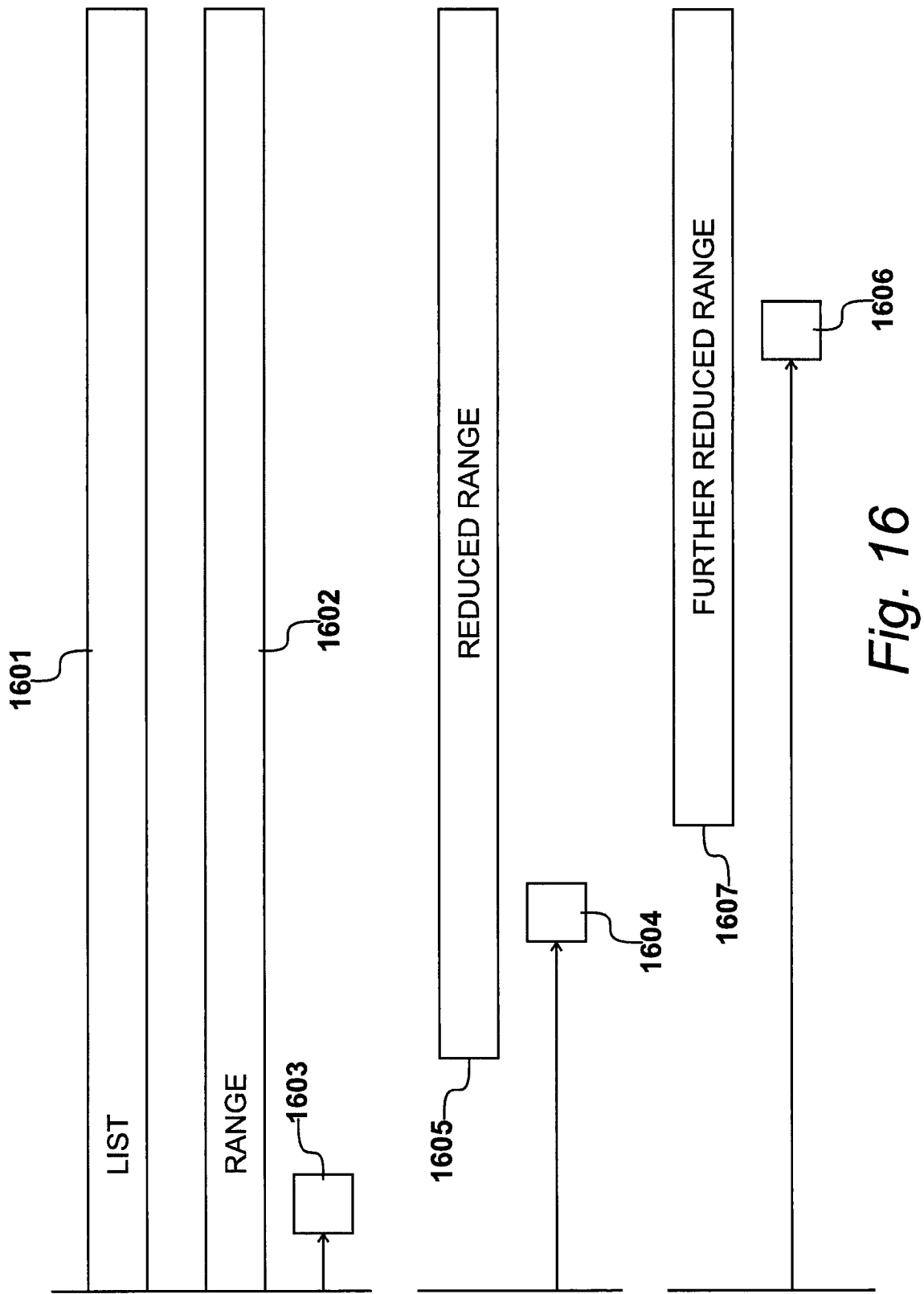
FIG. 16 shows a further embodiment for governing aspects of the present invention.

In FIG. 16, a list 1601 is identified, along with its associated range 1602. A scrolling operation has been initiated, such that the displayed portion has reached position 1603. At this position, a reduction of range 1602 has not occurred. Range reduction has been restricted at this point, such that it is still possible for reverse scrolling to be performed back to the start of the list.

Following further scrolling, the displayed portion reaches position 1604. Further movement of the displayed position has resulted in a governed reduction of the range, such that entities have been removed and the range now starts at position 1605. Similarly, it is not until the displayed portion has reached position 1606 that the range has been reduced such that it starts at position 1607.

FIG. 17

Figure 17:
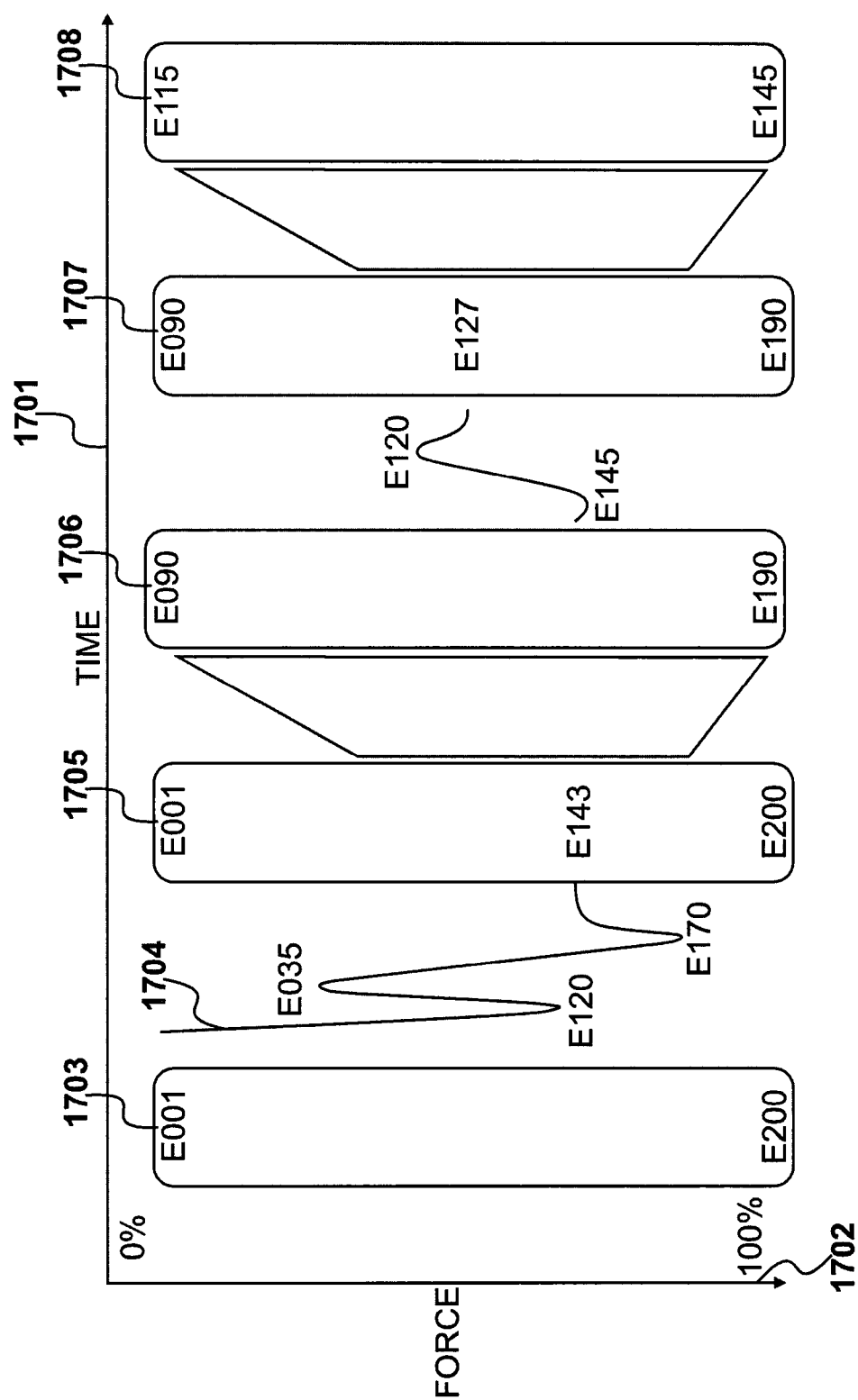
FIG. 17 shows an embodiment in which a scope of search is reduced when an applied force becomes stable.

A further embodiment is shown in FIG. 17, in which the scope of available entities, as defined by the range, reduces when an applied force becomes stable. In the representation of FIG. 17, time is illustrated on an axis 1701 and force is illustrated on an axis 1702. Initially, a range 1703 includes two hundred entities E001 to E200. Pressure is applied to initiate scrolling. As illustrated at 1704, pressure is increased to highlight entity E120, reduced to highlight entity E035 and then increased to highlight entity E170, until the force becomes steady to highlight entity E143. When a steady force has been detected, the scope of the range is reduced; from the range indicated at 1705 to the range indicated at 1706. Thus, range 1706 only covers entities E090 to E190.

Again, further variations in applied force occur, highlighting entity E145 and then highlighting entity E120. Again, the force becomes stable at a position highlighting entity E127. Again, the range indicated at 1707 (from entity E090 to entity E190) is reduced to the range indicated at 1708 covering entity E115 to entity E145. A selection can be made from the range or the extent of the range may be reduced further before a selection is made.

FIG. 18

Figure 18:
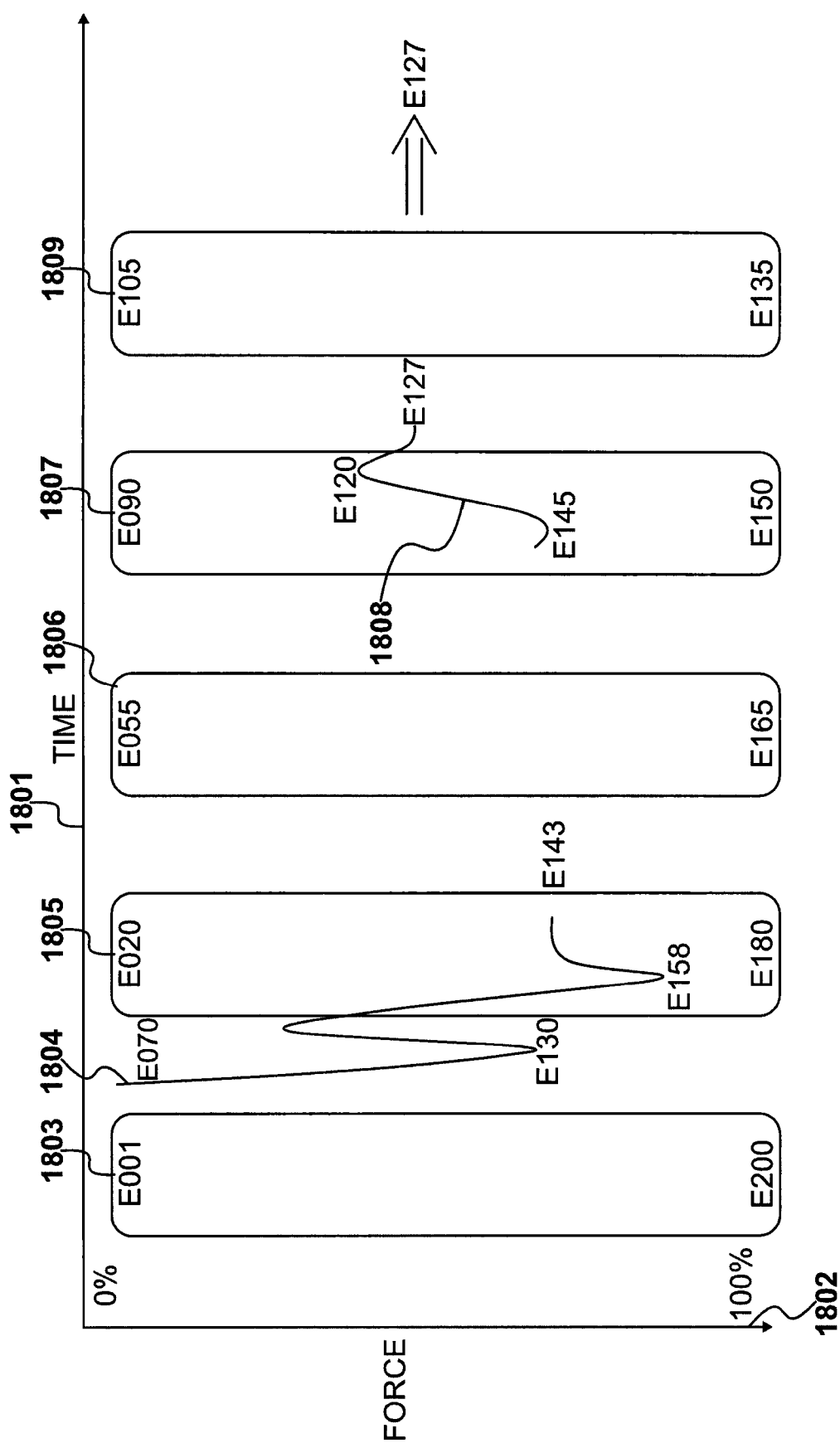
FIG. 18 shows an alternative embodiment in which the scope of search is reduced around a current selection over a period of time.

A further alternative embodiment is illustrated in FIG. 18. On this occasion, the scope of the range is reduced based purely on time, irrespective of variations in applied pressure, until an actual selection has been made. This may be referred to as a time-based zooming, as an alternative to pressure-based zooming.

Again, time is illustrated on an axis 1801 with force being represented on an axis 1802.

A first range 1803 includes entities from E001 to E200. A force is applied, as illustrated at 1804, in a similar manner to that illustrated at 1704. However, in this embodiment, the available range is being constrained by a measured duration. Thus, after a first elapsed period of time, the range is reduced, as indicated at 1805 to cover entities E020 to E180.

A further narrowing occurs, based on the time elapsed, such that the range is then reduced, as illustrated at 1806, from entity E055 to entity E165. After a further period of time, as illustrated at 1807, the range is reduced from entity E090 to entity E150. Pressure continues to be monitored, as illustrated by line 1808 and the range continues to be restricted, based on elapsed time. Thus, after a further period of time, the range is reduced to that illustrated at 1809, covering entities E105 to E135. Within this range, entity E127 has been selected.

The invention claimed is:

1. A method of facilitating manual selection of an entity from a list of entities displayed in a scrollable list, comprising the steps of:
   establishing a list of selectable entities;
   identifying a range of said selectable entities within said list;
   displaying a portion of said range;
   receiving an output signal in response to manually applied pressure;
   distinguishing said output signal between an initial normal pressure and a high pressure, wherein said high pressure is higher than said initial normal pressure;
   scrolling through said range at a rate related to said manually applied pressure; and
   reducing said range during said scrolling operation;
   wherein said identifying step initially identifies all of said entities as being within said range;
   wherein said reducing step includes removing entities from the range that have been moved away from during said scrolling step, and
   said method further comprises the steps of:
   detecting a change of applied pressure from said initial normal pressure to said high pressure at a noted position in said list during said scrolling operation;
   recording an end condition upon performing said scrolling step to an end of said range; and
   returning to said noted position upon the removal of said applied pressure.

2. The method of claim 1, wherein said plurality of entities are selected from a non-exclusive list of entities including: television channels; destinations for a navigation system; image frames from a video production and items of text in a text file.

3. The method of claim 1, wherein:
   said scrolling step scrolls from a start of said list to an end of said list; and
   said step of removing includes removing entities from said range progressively from said start.

4. The method of claim 1, wherein said reducing step only occurs upon a production of said high pressure.

5. The method of claim 1, further comprising the steps of:
   calculating a rate of change of applied pressure; and
   controlling the rate of said reducing step in response to said calculating step.

6. The method of claim 1, wherein said reducing step reduces said range to start at said noted position.

7. The method of claim 1, wherein said reducing step is governed to prevent an intended entity from being excluded from said range before a selection is made.

8. An apparatus for allowing a user to make a manual selection, comprising:
   a display device for displaying a range of entities in a scrollable list;
   a manually interactive device arranged to produce an output signal that changes by an extent related to an applied level of pressure; and
   a processing device configured to scroll through said range at a rate determined by said output signal, to reduce said range as a scrolling operation is performed, and to distinguish said output signal between an initial normal pressure and a high pressure, wherein said high pressure is higher than said initial normal pressure;
   wherein all said entities are initially identified as being within said range and said range is reduced by removing entities from the range that have been moved away from during said scrolling operation; and
   said processing device is further configured to:
   detect a change of applied pressure from said initial normal pressure to said high pressure at a noted position in said list during said scrolling operation;
   record an end condition upon performing said scrolling step to an end of said range; and
   return to said noted position upon the removal of said applied pressure.

9. The apparatus of claim 8, wherein said display device and said manually interactive device are combined in a touch sensitive screen.

10. The apparatus of claim 8, wherein said manually interactive device includes a sensor included in a controller for a device selected from a nonexclusive list including: a television remote control; a navigation system; a mobile device and an input device for a computer.

11. The apparatus of claim 8, wherein:
    said manually interactive device includes a sensor which identifies a position of a mechanical interaction in an xy plane; and
    said sensor identifies an extent of applied pressure in a z direction substantially perpendicular to said xy plane.

12. The apparatus of claim 11, wherein said identification of applied pressure is determined in response to resistive changes in said sensor.

13. A television system, comprising:
    a television-set; and
    a remote-control-device, having a sensor responsive to manually applied pressure; and
    a processor,
    wherein said television-set is configured to:
    display a portion of a range that is identified from a list of available television programs; and
    show a television program selected from said list; and
    wherein said processor is configured to:
    identify said range including initially identifying all said television programs as being within said range;
    receive an output signal from said sensor;
    distinguish said output signal between an initial normal pressure and a high pressure, wherein said high pressure is higher than said initial normal pressure;
    scroll through said range at a rate determined by said output signal to identify said portion for display;
    reduce said range during said scrolling operation by removing television programs from the range that have been moved away from during said scrolling step;
    detect a change of applied pressure from said initial normal pressure to said high pressure at a noted position in said list during said scrolling operation;
    record an end condition upon performing said scrolling step to an end of said range; and
    return to said noted position upon the removal of said applied pressure.

14. The system of claim 13, wherein said processor is further configured to:
    scroll from a start of said list to an end of said list; and
    remove entities from said range progressively from said start.

15. The system of claim 13, wherein said processor is further configured to:
    calculate a rate of change of applied pressure; and
    control the rate of said reduction in response to calculating said rate.

16. The system of claim 13, wherein said processor is further configured to reduce said range to start at said noted position.

\* \* \* \* \*